United States Patent
Liang et al.

(10) Patent No.: US 12,362,861 B2
(45) Date of Patent: *Jul. 15, 2025

(54) METHODS, DEVICES, AND MEDIUM FOR COMMUNICATION

(71) Applicant: NEC CORPORATION, Tokyo (JP)

(72) Inventors: Lin Liang, Beijing (CN); Gang Wang, Beijing (CN)

(73) Assignee: NEC CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 18/663,701

(22) Filed: May 14, 2024

(65) Prior Publication Data
US 2024/0297738 A1    Sep. 5, 2024

Related U.S. Application Data

(63) Continuation of application No. 17/916,687, filed as application No. PCT/CN2020/083386 on Apr. 4, 2020, now Pat. No. 12,015,485.

(51) Int. Cl.
*H04L 1/08*      (2006.01)
*H04W 74/00*   (2009.01)
*H04W 74/0833* (2024.01)

(52) U.S. Cl.
CPC ............ *H04L 1/08* (2013.01); *H04W 74/006* (2013.01); *H04W 74/0833* (2013.01)

(58) Field of Classification Search
CPC .... H04L 1/08; H04W 74/006; H04W 74/0833
USPC .......................... 714/748, 749, 750; 370/243
See application file for complete search history.

(56) References Cited

U.S. PATENT DOCUMENTS

| | | | | |
|---|---|---|---|---|
| 11,129,190 | B2* | 9/2021 | Kim | H04L 1/1819 |
| 11,405,145 | B2* | 8/2022 | Xiong | H04L 1/1854 |
| 12,015,485 | B2* | 6/2024 | Liang | H04L 1/08 |
| 12,133,263 | B2* | 10/2024 | Xiong | H04W 74/006 |

(Continued)

FOREIGN PATENT DOCUMENTS

| | | |
|---|---|---|
| CN | 102238750 A | 11/2011 |
| CN | 109982444 A | 9/2019 |

(Continued)

OTHER PUBLICATIONS

Huawei, Hisilicon, "Consideration on RACK procedure in coverage enhancement", 3GPP TSG RAN WG2 Meeting #90, R2-152232, May 25-29, 2015, 4 pgs., Fukuoka, Japan.

(Continued)

*Primary Examiner* — John J Tabone, Jr.
(74) *Attorney, Agent, or Firm* — Sughrue Mion, PLLC

(57) ABSTRACT

Embodiments of the present disclosure relate to communication. According to embodiments of the present disclosure, a network device is able to configure resources dedicated to repetition of transmission during the access procedure. If a terminal device determines to perform the repetition of transmission, the terminal device uses the dedicated resources for the transmission. The numbers of the repetition are determined based on a target power for the transmission and a maximum power at the terminal device. In this way, it improves coverage of the terminal device and the success in accessing channel.

9 Claims, 5 Drawing Sheets

(56) References Cited

U.S. PATENT DOCUMENTS

| | | | |
|---|---|---|---|
| 2013/0279412 A1* | 10/2013 | Webb | H04W 74/0833 |
| | | | 370/328 |
| 2016/0309507 A1* | 10/2016 | Park | H04W 4/70 |
| 2017/0332409 A1 | 11/2017 | Yerramalli et al. | |
| 2019/0342920 A1 | 11/2019 | Ohta et al. | |
| 2019/0342921 A1* | 11/2019 | Loehr | H04L 5/0053 |
| 2020/0037297 A1 | 1/2020 | Pan et al. | |
| 2021/0020535 A1 | 1/2021 | Ko et al. | |
| 2021/0112590 A1* | 4/2021 | Kim | H04W 74/002 |
| 2021/0120535 A1 | 4/2021 | Pan et al. | |
| 2022/0033964 A1 | 2/2022 | Chen et al. | |
| 2022/0116999 A1* | 4/2022 | Xiong | H04W 74/006 |
| 2022/0303964 A1 | 9/2022 | Pan et al. | |
| 2022/0368468 A1* | 11/2022 | Xiong | H04L 5/0055 |
| 2022/0408478 A1* | 12/2022 | Christoffersson | |
| | | | H04W 74/0833 |
| 2023/0140970 A1* | 5/2023 | Lin | H04L 1/1819 |
| | | | 370/329 |
| 2023/0163880 A1* | 5/2023 | Liang | H04W 74/0833 |
| | | | 714/726 |
| 2023/0199860 A1* | 6/2023 | Lee | H04W 74/0816 |
| | | | 370/329 |
| 2024/0089931 A1 | 3/2024 | Pan et al. | |
| 2024/0297738 A1* | 9/2024 | Liang | H04W 74/0833 |

FOREIGN PATENT DOCUMENTS

| | | |
|---|---|---|
| JP | 2013-138506 A | 7/2013 |
| JP | 2019-534615 A | 11/2019 |
| JP | 2020504519 A | 2/2020 |
| WO | 2016158930 A1 | 10/2016 |
| WO | 2017/030485 A1 | 2/2017 |
| WO | 2018/054099 A1 | 3/2018 |
| WO | 2018174577 A1 | 9/2018 |
| WO | 2019/216818 A1 | 11/2019 |

OTHER PUBLICATIONS

Samsung, "RAR/Msg3/Msg4 Transmission for Low Cost UEs in Enchanced Coverage", 3GPP TSG RAN WG1 #82bis, R1-155440, Oct. 5-9, 2015, Malmo, Sweden, pp. 1-3 (3 pages total).
Japanese Office Action dated Oct. 17, 2023 in Japanese Application No. 2022-560344.
Written Opinion of the International Search Report for PCT/CN2020/083386 dated, Dec. 30, 2020 (PCT/ISA/237).
International Search Report for PCT/CN2020/083386 dated, Dec. 30, 2020 (PCT/ISA/210).
Extended European Search Report issued Mar. 27, 2023 in European Application No. 20928509.7.
Communication dated Apr. 1, 2025 issued by the Japanese Patent Office in application No. 2024-095530.

* cited by examiner

METHODS, DEVICES, AND MEDIUM FOR COMMUNICATION

CROSS-REFERENCE TO RELATED APPLICATION

This application is a Continuation of U.S. application Ser. No. 17/916,687, filed on Oct. 3, 2022, which is a National Stage Entry of PCT/CN2020/083386 filed on Apr. 4, 2020, the disclosures of all of which are incorporated herein in their entirety by reference thereto.

TECHNICAL FIELD

Embodiments of the present disclosure generally relate to the field of telecommunication, and in particular, to methods, devices, and medium for communication.

BACKGROUND

Generally, a power level at a terminal device may be not high. On one hand, low power can reduce cost of equipment, on the other hand low power means lower uplink coverage. In some embodiments, the terminal device may perform retransmission via radio resource control (RRC) signaling to address coverage issues. However, retransmission during an access procedure still needs to be discussed.

SUMMARY

In general, example embodiments of the present disclosure provide a solution of repetition of transmission during an access procedure.

In a first aspect, there is provided a method for communication. The method comprises receiving, at a terminal device and from a network device, information indicating at least one resource allocated for a repetition of transmission during an access procedure. The method further comprises in accordance with a determination that the repetition of transmission is applicable during the access procedure, determining a target resource based at least in part on the information. The method also comprises transmitting an access request for the access procedure on the target resource.

In a second aspect, there is provided a method for communication. The method comprises transmitting, at a network device and to a terminal device, information indicating at least one resource allocated for a repetition of transmission during an access procedure. The method also comprises receiving an access request from the terminal device on a target resource determined based at least in part on the information.

In a third aspect, there is provided a terminal device. The terminal device comprises a processing unit; and a memory coupled to the processing unit and storing instructions thereon, the instructions, when executed by the processing unit, causing the terminal device to perform receiving from a network device, information indicating at least one resource allocated for a repetition of transmission during an access procedure; in accordance with a determination that the repetition of transmission is applicable during the access procedure, determining a target resource based at least in part on the information; and transmitting an access request for the access procedure on the target resource.

In a fourth aspect, there is provided a network device. The network device comprises a processing unit; and a memory coupled to the processing unit and storing instructions thereon, the instructions, when executed by the processing unit, causing the network device to perform transmitting, to a terminal device, information indicating at least one resource allocated for a repetition of transmission during an access procedure; and receiving an access request from the terminal device on a target resource determined based at least in part on the information.

In a fifth aspect, there is provided a computer readable medium having instructions stored thereon, the instructions, when executed on at least one processor, causing the at least one processor to carry out the method according to any one of the first aspect or second aspect.

Other features of the present disclosure will become easily comprehensible through the following description.

BRIEF DESCRIPTION OF THE DRAWINGS

Through the more detailed description of some example embodiments of the present disclosure in the accompanying drawings, the above and other objects, features and advantages of the present disclosure will become more apparent, wherein.

Throughout the drawings, the same or similar reference numerals represent the same or similar element.

DETAILED DESCRIPTION

Figure 1:
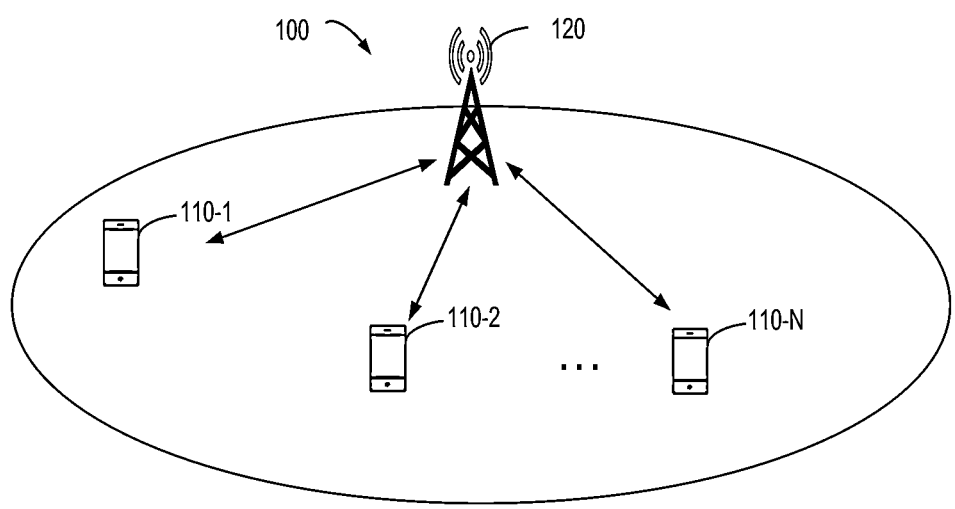
FIG. 1 is a schematic diagram of a communication environment in which embodiments of the present disclosure can be implemented.

Principle of the present disclosure will now be described with reference to some example embodiments. It is to be understood that these embodiments are described only for the purpose of illustration and help those skilled in the art to understand and implement the present disclosure, without suggesting any limitations as to the scope of the disclosure. The disclosure described herein can be implemented in various manners other than the ones described below.

In the following description and claims, unless defined otherwise, all technical and scientific terms used herein have the same meaning as commonly understood by one of ordinary skills in the art to which this disclosure belongs.

As used herein, the term "network device" refers to a device which is capable of providing or hosting a cell or coverage where terminal devices can communicate. Examples of a network device include, but not limited to, a Node B (NodeB or NB), an Evolved NodeB (eNodeB or eNB), a NodeB in new radio access (gNB) a Remote Radio Unit (RRU), a radio head (RH), a remote radio head (RRH), a low power node such as a femto node, a pico node, a satellite network device, an aircraft network device, and the like. For the purpose of discussion, in the following, some example embodiments will be described with reference to eNB as examples of the network device.

As used herein, the term "terminal device" refers to any device having wireless or wired communication capabilities. Examples of the terminal device include, but not limited to, user equipment (UE), personal computers, desktops, mobile phones, cellular phones, smart phones, personal digital assistants (PDAs), portable computers, tablets, wearable devices, internet of things (IOT) devices, Internet of Everything (IoE) devices, machine type communication (MTC) devices, device on vehicle for V2X communication where X means pedestrian, vehicle, or infrastructure/network, or image capture devices such as digital cameras, gaming devices, music storage and playback appliances, or Internet appliances enabling wireless or wired Internet access and browsing and the like. In the following description, the terms "terminal device", "communication device", "terminal", "user equipment" and "UE" may be used interchangeably.

Communications discussed herein may use conform to any suitable standards including, but not limited to, New Radio Access (NR), Long Term Evolution (LTE), LTE-Evolution, LTE-Advanced (LTE-A), Wideband Code Division Multiple Access (WCDMA), Code Division Multiple Access (CDMA), cdma2000, and Global System for Mobile Communications (GSM) and the like. Furthermore, the communications may be performed according to any generation communication protocols either currently known or to be developed in the future. Examples of the communication protocols include, but not limited to, the first generation (1G), the second generation (2G), 2.5G, 2.85G, the third generation (3G), the fourth generation (4G), 4.5G, the fifth generation (5G) communication protocols. The techniques described herein may be used for the wireless networks and radio technologies mentioned above as well as other wireless networks and radio technologies.

As used herein, the singular forms "a", "an" and "the" are intended to include the plural forms as well, unless the context clearly indicates otherwise. The term "includes" and its variants are to be read as open terms that mean "includes, but is not limited to." The term "based on" is to be read as "based at least in part on." The term "one embodiment" and "an embodiment" are to be read as "at least one embodiment." The term "another embodiment" is to be read as "at least one other embodiment." The terms "first," "second," and the like may refer to different or same objects. Other definitions, explicit and implicit, may be included below.

In some examples, values, procedures, or apparatus are referred to as "best," "lowest," "highest," "minimum," "maximum," or the like. It will be appreciated that such descriptions are intended to indicate that a selection among many used functional alternatives can be made, and such selections need not be better, smaller, higher, or otherwise preferable to other selections.

In conventional communication systems, a power level at a terminal device may be not high. On one hand low power can reduce the cost of equipment, on the other hand low power means lower uplink coverage. In some embodiment, the terminal device may perform retransmission via radio resource control (RRC) signaling to address coverage issues.

When transmitting physical uplink shared channel (PUSCH) scheduled by downlink control information in physical downlink control channel (PDCCH), if the terminal device is configured with pusch-AggregationFactor, the same symbol allocation is applied across the pusch-AggregationFactor consecutive slots and the PUSCH is limited to a single transmission layer. The terminal device shall repeat the transport block across the pusch-AggregationFactor consecutive slots applying the same symbol allocation in each slot.

For PUCCH formats 1, 3, or 4, the terminal device can be configured a number of slots for repetitions of a PUCCH transmission by respective nrofSlots. Before dedicate RRC configuration, there is no repetition on PUSCH and PUCCH.

According to conventional technologies, the terminal device may determine a coverage enhancement level required for the terminal device; repeatedly transmitting a physical random access channel (PRACH) signal. However, it does not discuss how to determine the coverage enhancement level.

In other conventional technologies, the repetition may be determined based on a selected transport block size. However, it does not solve the low power issue at the terminal device. Therefore, how to signal more repetition of PUSCH/PUCCH in RRC signal and how to signal and perform repetition for message 3 PUSCH and HARQ-ACK feedback of msg4 on PUCCH needs to be further studied.

In order to solve at least part of the aforementioned problems, new technologies in repetition of transmission during an access procedure are needed. According to embodiments of the present disclosure, a network device is able to configure resources dedicated to repetition of transmission during the access procedure. If a terminal device determines to perform the repetition of transmission, the terminal device uses the dedicated resources for the transmission. The numbers of the repetition are determined based on a target power for the transmission and a maximum power at the terminal device. In this way, it improves coverage of the terminal device and success in accessing channel.

FIG. 1 illustrates a schematic diagram of a communication system in which embodiments of the present disclosure can be implemented. The communication system 100, which is a part of a communication network, comprises a terminal device 110-1, a terminal device 110-2, . . . , a terminal device 110-N, which can be collectively referred to as "terminal device(s) 110."

The communication system 100 further comprises a network device 120. In the communication system 100, the network devices 110 and the terminal devices 120 can communicate data and control information to each other. The numbers of terminal devices and network devices shown in FIG. 1 are given for the purpose of illustration without suggesting any limitations.

Communications in the communication system ay be implemented according to any proper communication protocol(s), comprising, but not limited to, cellular communication protocols of the first generation (1G), the second generation (2G), the third generation (3G), the fourth generation (4G) and the fifth generation (5G) and on the like, wireless local network communication protocols such as Institute for Electrical and Electronics Engineers (IEEE) 802.11 and the like, and/or any other protocols currently known or to be developed in the future. Moreover, the communication may utilize any proper wireless communication technology, comprising but not limited to: Code Divided Multiple Address (CDMA), Frequency Divided Multiple Address (FDMA), Time Divided Multiple Address (TDMA), Frequency Divided Duplexer (FDD), Time Divided Duplexer (TDD), Multiple-Input Multiple-Output (MIMO), Orthogonal Frequency Divided Multiple Access (OFDMA) and/or any other technologies currently known or to be developed in the future.

Figure 2:
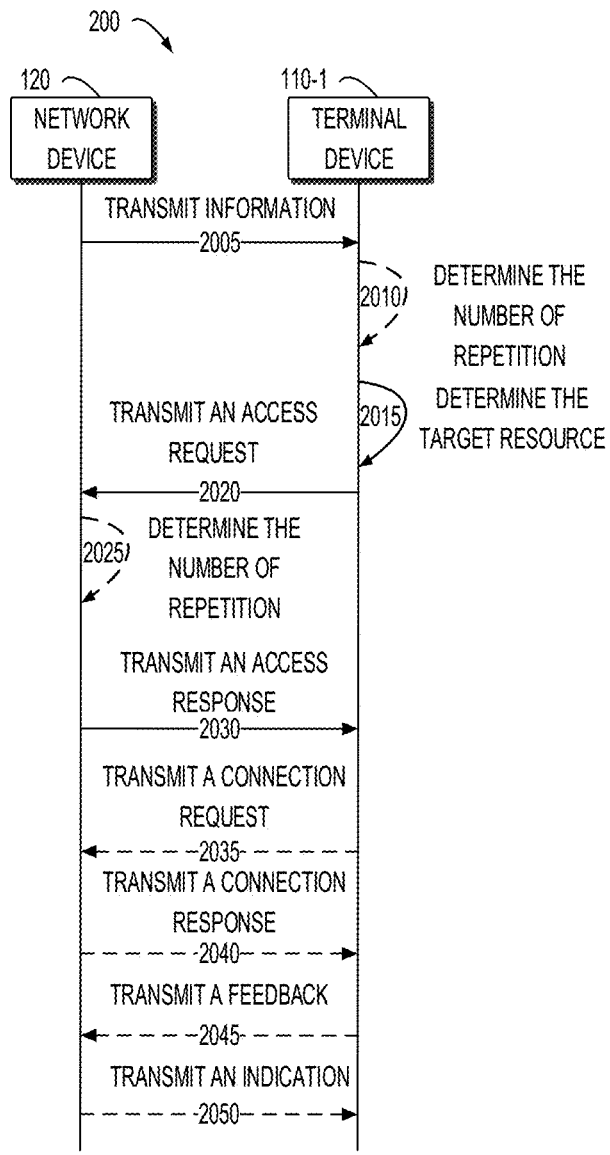
FIG. 2 is a signaling chart illustrating a process according to an embodiment of the present disclosure.

Embodiments of the present disclosure will be described in detail below. Reference is first made to FIG. 2, which shows a signaling chart illustrating interactions 200 among network devices according to some example embodiments of the present disclosure. Only for the purpose of discussion, the process 200 will be described with reference to FIG. 1.

The process 200 may involve the terminal device 110-1 and the network device 120 in FIG. 1.

The network device 120 transmits 2005 information to the terminal device 110-1. The information indicates one or more resources allocated for a repetition of transmission during the access procedure. The resources may be dedicated PRACH resources. Alternatively, the resources may be different preamble indexes. The information may be transmitted via RRC system information block. It should be noted that the information can be transmitted via any suitable signaling.

In some embodiments, the terminal device 110-1 may determine 2010 the number of repetition of transmission based on a target power of the transmission and an available power at the terminal device 110-1. By way of example, the available power may be the maximum power of the terminal device 110-1. For example, the margin power of the terminal device 110-1 may be determined based on the following:

$$S = P\_target + PL - P\_available \quad (1)$$

where P_target is the target power (for example, PREAMBLE RECEIVED TARGETP_POWER) provided by higher layers, PL is the path loss, and P_available is the maximum power at the terminal device 110-1. In this situation, the transmission power during the access procedure is minimum (P_available, P_target+PL).

By way of example, the repetition factor which is represented as "N" can be obtained from Table 1. It should be noted that the values in Table 1 are only examples not limitations.

comprise "Msg3-repetition4-preamble-list SEQUENCE of (1 ... maxPreamblePerRepetation) integer (1 ... 64)" which is used to configure the PRACH preamble for 4 times repetition PUSCH transmission.

In other example embodiments, the information may indicate that the preamble indexes 11-20 are used for 4 times repetition and the preamble indexes 21-30 are used for 8 times repetition. In this situation, if the terminal device 110-1 determines the number of repetitions to be 4 according to Table 1, the terminal device 110-1 may select a preamble from the preambles 11-20.

Alternatively, the resources may be allocated for all repetitions. In this situation, if the terminal device 110-1 determines to perform the repetitions of the transmission, the terminal device 110-1 may determine the target resource based on the information. In this way, the network device 120 may understand that the terminal device 110-1 supports the repetitions.

The terminal device 110-1 transmits 2020 an access request to the network device 120. In some embodiments, the terminal device 110-1 may transmit message 1 to the network device 120. For example, if the terminal device 110-1 determines the number of repetitions to be 4, the terminal device 110-1 may transmit the preamble index in the Msg3-repetition4-preamble-list. Alternatively, the terminal device 110-1 may transmit message A to the network device 120. Similarly, if the terminal device 110-1 determines the number of repetitions to be 4, the terminal device 110-1 may transmit the preamble index in a preamble list allocated for the message A.

In some embodiments, the network device 120 may determine 2025 the number of repetitions. For example, the

TABLE 1

| S | s <= 0 | 0 < s <= 3 | 3 < s <= 4.77 | 4.77 < s <= 6 | 6 < s <= 7 | 7 < s <= 7.78 | 7.78 < s <= 8.85 | S > 8.85 |
|---|---|---|---|---|---|---|---|---|
| N | 1 | 2 | 3 | 4 | 5 | 6 | 7 | 8 |

In some embodiments, the terminal device 110-1 may determine the number of repetitions "Nm" is equal to the selected repetition factor N. Alliteratively, the number of repetitions may be larger than the selected repetition factor N. The S may be calculated only for the first PRACH transmission and the selected N may be used for the rest PRACH procedure.

In some embodiments, the terminal device 110-1 may determine the repetition Nm that the minimum value configured by RRC which is equal or larger than selected N. The terminal device 110-1 may use the Nm in random access response (RAR) for the following transmission once the granted radio network temporary identifier (RNTI) is equal to temporary cell radio network temporary identifier (TC-RNTI) in RAR.

The terminal device 110-1 determines 2015 a target resource based at least in part on the information. In this way, the repetitions of transmission during the access procedure can be achieved. The repetition can be adjusted based on the power of the terminal device, thereby improving the success in access procedure.

In some embodiments, the resources may be configured per repetition. For example, the network device 120 may configure different preambles for different numbers of repetition. In other embodiment, the network device 120 may configure different PRACH resources for different numbers of repetition. By way of example, the information may network device 120 may estimate the available power at the terminal device 110-1 based on the received access request. The network device 120 may compare the estimated power with the target power and determine the number of repetitions based on the comparison. By way of example, the network device 120 may determine the number of repetitions according to Table 1 above. For example, if the difference between the target power and the estimated power is smaller than one and lager than zero, the network device 120 may determine the number of repetitions is two.

The network device 120 transmits 2030 an access response to the terminal device 110-1. For example, the network device 120 may transmit message 2 to the terminal device 110-1. Alternatively, the network device 120 may transmit message B to the terminal deice 110-1. In some embodiments, the access response (for example, the message 2) may indicate the number of repetitions determined by the network device 120. It should be noted that the access response may also indicate other resource allocation. For example, the access response may comprise one or more radio network temporary identifiers.

Alternatively or in addition, the terminal device 110-1 may transmit 2035 a connection request to the network device 120 based on the number of repetitions. For example, the terminal device 110-1 may retransmit message 3 to the network device 120 based on the number of repetitions. In some embodiments, the terminal device 110-1 may use the number of repetitions "Nm" as the pusch-AggregationFactor for message 3 PUSCH transmission. Alternatively, the terminal device 110-1 may use the number of repetitions "Nm" as nrofSlots for PUCCH transmission.

In an example embodiment, the terminal device 110-1 may determine a time resource for the connection request based on Table 2 below. For example, there may be 4 bits PUSCH time resource allocation filed. Table 2 may combine encoding the number of repetition and other PUSCH resource application parameters. It should be noted that the parameters in Table 2 are only examples not limitations.

TABLE 2

| Row index | PUSCH mapping type | K2 | Start point | Length | The number of repetition (Nm) |
|---|---|---|---|---|---|
| 1 | Type A | j | 0 | 14 | 2 |
| 2 | Type A | j | 0 | 10 | 2 |
| 3 | Type A | j + 1 | 0 | 14 | 2 |
| 4 | Type A | j + 1 | 0 | 10 | 2 |
| 5 | Type A | j + 2 | 0 | 14 | 2 |
| 6 | Type A | j + 2 | 0 | 10 | 7 |
| 7 | Type A | j + 3 | 0 | 14 | 2 |
| 8 | Type A | j + 3 | 0 | 10 | 2 |
| 9 | Type A | j | 0 | 14 | 4 |
| 10 | Type A | j | 0 | 10 | 4 |
| 11 | Type A | j + 2 | 0 | 14 | 4 |
| 12 | Type A | j + 2 | 0 | 10 | 4 |
| 13 | Type A | j | 0 | 14 | 8 |
| 14 | Type A | j | 0 | 10 | 8 |
| 15 | Type A | j + 2 | 0 | 14 | 8 |
| 16 | Type A | j + 2 | 0 | 10 | 8 |

In some embodiments, the network device 120 may transmit 2040 a connection response. For example, the network device 120 may transmit message 4 to the terminal device 110-1. The terminal device 110-1 may transmit 2045 a feedback to the network device 120. In some embodiments, the terminal device 110-1 may retransmit the feedback based on the number of repetitions.

The network device 120 may transmit 2050 an indication to the terminal device 110-1. The indication may comprise the extended number of supported repetitions after the access procedure. For example, a new RRC parameter pusch-AggregationFactor-extend may be transmitted.

In some embodiments, the number of repetitions may be extended, for example, to 16, 32 or any suitable number. For example, if pusch-AggregationFactor-extend is present and pusch-AggregationFactor is not present, it means that the number of repetitions has been extended to 16 and 32.

Alternatively, if pusch-AggregationFactor is not present and pusch-AggregationFactor-extend is present, the number of repetitions may be up to 16. When both pusch-AggregationFactor and pusch-AggregationFactor-extend are present, the number of repetitions is pusch-AggregationFactor value multiplying pusch-AggregationFactor-extend value, for example, 32, 64 or 128. It should be noted that the number of repetitions can be any suitable number.

According to embodiments of the present disclosure, it can improve coverage of the terminal device. The terminal device is still able to access the channel even if the power at the terminal device may not be strong enough. Moreover, uplink coverage performance can be further improved for coverage limited scenario or lower power equipment.

Figure 3:
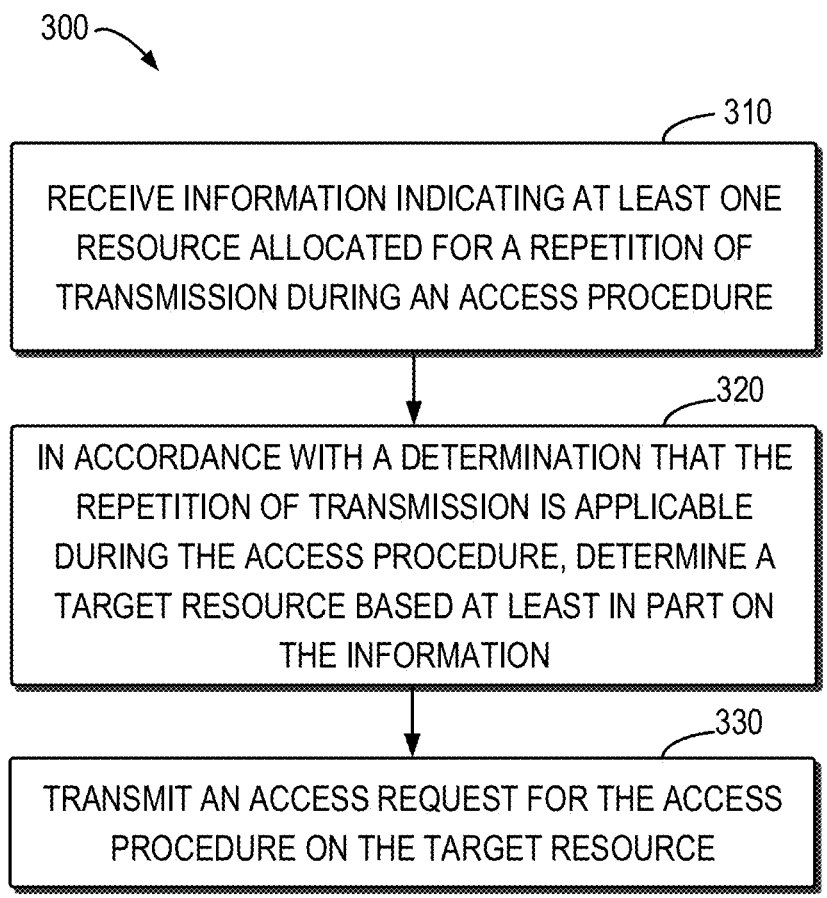
FIG. 3 is a flowchart of an example method in accordance with an embodiment of the present disclosure.

FIG. 3 shows a flowchart of an example method 300 in accordance with an embodiment of the present disclosure. Only for the purpose of illustrations, the method 300 can be implemented at a terminal device 110-1 as shown in FIG. 1.

At block 310, the terminal device 110-1 receives information from the network device 120. The information indicates one or more resources allocated for repetitions of transmission during the access procedure. The resources may be dedicated physical random access channel (PRACH) resources. Alternatively, the resources may be different preamble indexes. The information may be transmitted via radio resource control (RRC) system information block. It should be noted that the information can be transmitted via any suitable signaling.

At block 320, the terminal device 110-1 determines a target resource based at least in part on the information if the repetitions of the transmission are applicable during the access procedure. In this way, the repetitions of transmission during the access procedure can be achieved. The repetition can be adjusted based on the power of the terminal device, thereby improving the success in access procedure.

In some embodiments, the terminal device 110-1 may determine 2010 the number of repetitions of transmission based on a target power of the transmission and an available power at the terminal device 110-1. By way of example, the available power may be the maximum power of the terminal device 110-1.

In some embodiments, the resources may be configured per repetition. For example, the network device 120 may configure different preambles for different numbers of repetition. In other embodiment, the network device 120 may configure different PRACH resources for different numbers of repetition. By way of example, the information may comprise "Msg3-repetition4-preamble-list SEQUENCE of (1 . . . maxPreamblePerRepetation) integer (1 . . . 64)" which is used to configure the PRACH preamble for 4 times repetition PUSCH transmission.

In other example embodiments, the information may indicate that the preamble indexes 11-20 are used for 4 times repetition and the preamble indexes 21-30 are used for 8 times repetition. In this situation, if the terminal device 110-1 determines the number of repetitions to be 4 according to Table 1, the terminal device 110-1 may select a preamble from the preambles 11-20.

Alternatively, the resources may be allocated for all repetitions. In this situation, if the terminal device 110-1 determines to perform the repetitions of the transmission, the terminal device 110-1 may determine the target resource based on the information. In this way, the network device 120 may understand that the terminal device 110-1 supports the repetitions.

In some embodiments, the terminal device 110-1 may determine the repetition Nm that the minimum value configured by RRC which is equal or larger than selected N. The terminal device 110-1 may use the Nm in RAR for the following transmission once the granted radio network temporary identifier (RNTI) is equal to temporary cell radio network temporary identifier (TC-RNTI) in RAR.

At block 330, the terminal device 110-1 transmits an access request to the network device 120. In some embodiments, the terminal device 110-1 may transmit message 1 to the network device 120. For example, if the terminal device 110-1 determines the number of repetitions to be 4, the terminal device 110-1 may transmit the preamble index in the Msg3-repetition4-preamble-list. Alternatively, the terminal device 110-1 may transmit message A to the network device 120. Similarly, if the terminal device 110-1 determines the number of repetitions to be 4, the terminal device 110-1 may transmit the preamble index in a preamble list allocated for the message A. In some embodiments, the terminal device 110-1 may receive an access response from the network device 120. The access response may indicate the number of repetitions during the access procedure which is determined by the network device 120.

Alternatively or in addition, the terminal device 110-1 may transmit a connection request to the network device 120 based on the number of repetitions. For example, the terminal device 110-1 may retransmit message 3 to the network device 120 based on the number of repetitions. In some embodiments, the terminal device 110-1 may use the number of repetitions "Nm" as the pusch-AggregationFactor for message 3 PUSCH transmission. Alternatively, the terminal device 110-1 may use the number of repetitions "Nm" as nrofSlots for PUCCH transmission.

In an example embodiment, the terminal device 110-1 may determine a time resource for the connection request based on Table 2 above. For example, there may be 4 bits PUSCH time resource allocation filed.

In some embodiments, the terminal device 110-1 may transmit a feedback to the network device 120. In some embodiments, the terminal device 110-1 may retransmit the feedback based on the number of repetitions.

The terminal device 110-1 may receive an indication from the network device 120. The indication may comprise the extended number of supported repetitions after the access procedure. For example, a new RRC parameter pusch-AggregationFactor-extend may be transmitted.

In some embodiments, the number of repetitions may be extended, for example, to 16, 32 or any suitable number. For example, if pusch-AggregationFactor-extend is present and pusch-AggregationFactor is not present, it means that the number of repetitions has been extended to 16 and 32.

Alternatively, if pusch-AggregationFactor is not present and pusch-AggregationFactor-extend is present, the number of repetitions may be up to 16. When both pusch-AggregationFactor and pusch-AggregationFactor-extend are present, the number of repetitions is pusch-AggregationFactor value multiplying pusch-AggregationFactor-extend value, for example, 32, 64 or 128. It should be noted that the number of repetitions can be any suitable number.

Figure 4:
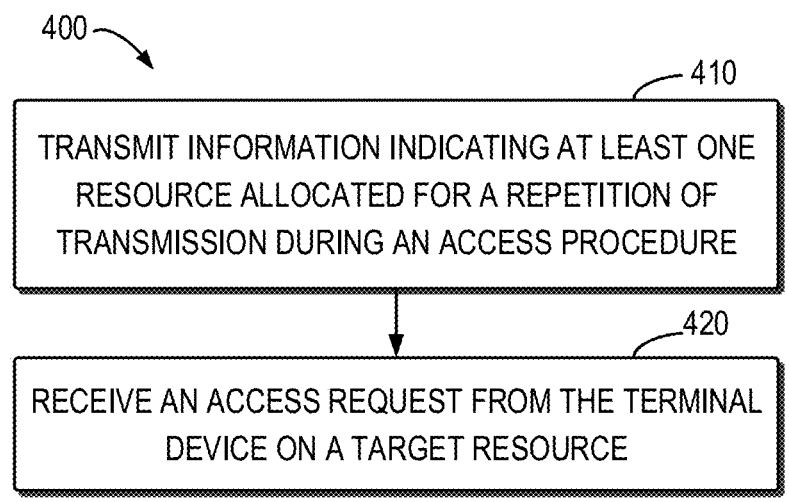
FIG. 4 is a flowchart of an example method in accordance with an embodiment of the present disclosure.

FIG. 4 shows a flowchart of an example method 400 in accordance with an embodiment of the present disclosure. Only for the purpose of illustrations, the method 400 can be implemented at a network device 120 as shown in FIG. 1.

At block 410, the network device 120 transmit information to the terminal device 110-1. The information indicates one or more resources allocated for repetitions of transmission during the access procedure. The resources may be dedicated PRACH resources. Alternatively, the resources may be different preamble indexes. The information may be transmitted via RRC system information block. It should be noted that the information can be transmitted via any suitable signaling.

In some embodiments, the resources may be configured per repetition. For example, the network device 120 may configure different preambles for different numbers of repetition. In other embodiment, the network device 120 may configure different PRACH resources for different numbers of repetition. Alternatively, the resources may be allocated for all repetitions.

In some embodiments, the network device 120 may determine 2025 the number of repetitions. For example, the network device 120 may estimate the available power at the terminal device 110-1 based on the received access request. The network device 120 may compare the estimated power with the target power and determine the number of repetitions based on the comparison.

At block 420, the network device 120 transmits an access response to the terminal device 110-1. For example, the network device 120 may transmit message 2 to the terminal device 110-1. Alternatively, the network device 120 may transmit message B to the terminal deice 110-1. In some embodiments, the access response may indicate the number of repetitions determined by the network device 120. It should be noted that the access response may also indicate other resource allocation. For example, the access response may comprise one or more radio network temporary identifiers.

In some embodiments, the network device 120 may transmit a connection response. For example, the network device 120 may transmit message 4 to the terminal device 110-1. The network device 120 may transmit an indication to the terminal device 110-1. The indication may comprise the extended number of supported repetitions after the access procedure. For example, a new RRC parameter pusch-AggregationFactor-extend may be transmitted.

In some embodiments, the number of repetitions may be extended, for example, to 16, 32 or any suitable number. For example, if pusch-AggregationFactor-extend is present and pusch-AggregationFactor is not present, it means that the number of repetitions has been extended to 16 and 32.

Alternatively, if pusch-AggregationFactor is not present and pusch-AggregationFactor-extend is present, the number of repetitions may be up to 16. When both pusch-AggregationFactor and pusch-AggregationFactor-extend are present, the number of repetitions is pusch-AggregationFactor value multiplying pusch-AggregationFactor-extend value, for example, 32, 64 or 128. It should be noted that the number of repetitions can be any suitable number.

Figure 5:
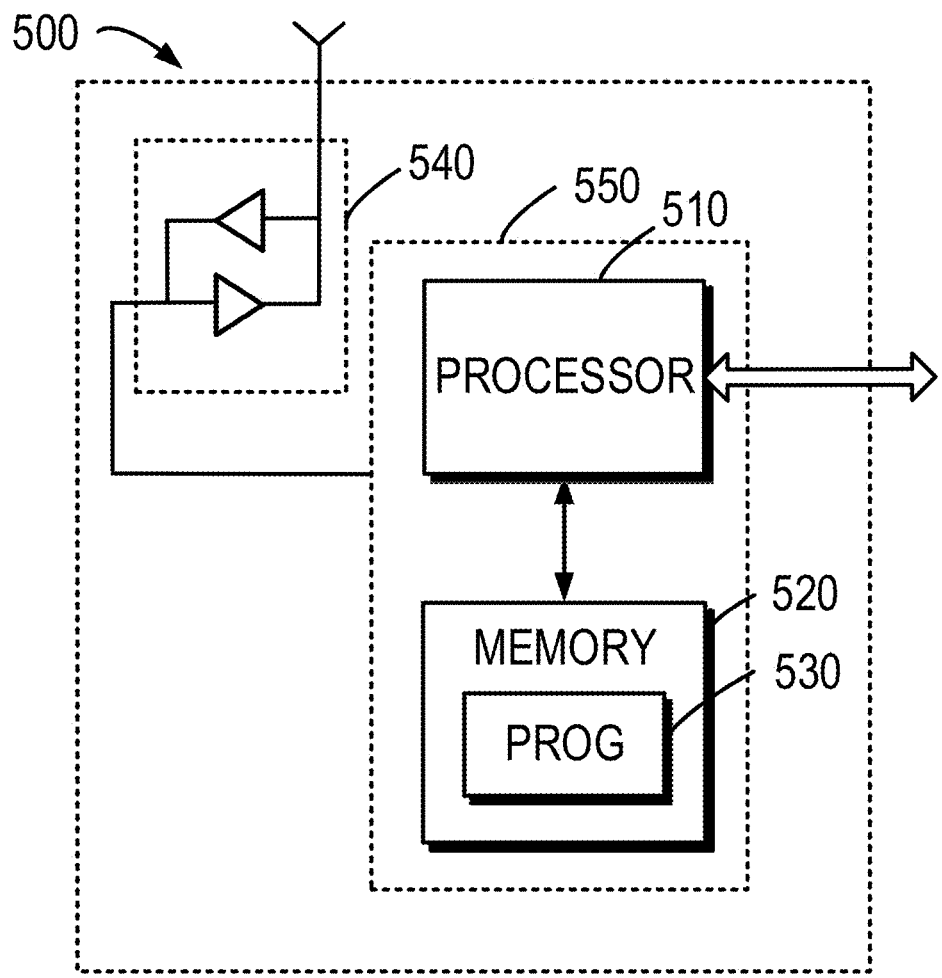
FIG. 5 is a simplified block diagram of a device that is suitable for implementing embodiments of the present disclosure.

FIG. 5 is a simplified block diagram of a device 500 that is suitable for implementing embodiments of the present disclosure. The device 500 can be considered as a further example implementation of the terminal device 110 and the network device 120 as shown in FIG. 1. Accordingly, the device 500 can be implemented at or as at least a part of the terminal device 110 or the network device 120.

As shown, the device 500 includes a processor 510, a memory 520 coupled to the processor 510, a suitable transmitter (TX) and receiver (RX) 540 coupled to the processor 510, and a communication interface coupled to the TX/RX 540. The memory 520 stores at least a part of a program 530. The TX/RX 540 is for bidirectional communications. The TX/RX 540 has at least one antenna to facilitate communication, though in practice an Access Node mentioned in this application may have several ones. The communication interface may represent any interface that is necessary for communication with other network elements, such as X2 interface for bidirectional communications between eNBs, SI interface for communication between a Mobility Management Entity (MME)/Serving Gateway (S-GW) and the eNB, Un interface for communication between the eNB and a relay node (RN), or Uu interface for communication between the eNB and a terminal device.

The program 530 is assumed to include program instructions that, when executed by the associated processor 510, enable the device 500 to operate in accordance with the embodiments of the present disclosure, as discussed herein with reference to FIGS. 2 to 4. The embodiments herein may be implemented by computer software executable by the processor 510 of the device 500, or by hardware, or by a combination of software and hardware. The processor 510 may be configured to implement various embodiments of the present disclosure. Furthermore, a combination of the processor 510 and memory 520 may form processing means 550 adapted to implement various embodiments of the present disclosure.

The memory 520 may be of any type suitable to the local technical network and may be implemented using any suitable data storage technology, such as a non-transitory computer readable storage medium, semiconductor-based memory devices, magnetic memory devices and systems, optical memory devices and systems, fixed memory and removable memory, as non-limiting examples. While only one memory 520 is shown in the device 500, there may be several physically distinct memory modules in the device 500. The processor 510 may be of any type suitable to the local technical network, and may include one or more of general purpose computers, special purpose computers, microprocessors, digital signal processors (DSPs) and processors based on multicore processor architecture, as non-limiting examples. The device 500 may have multiple processors, such as an application specific integrated circuit chip that is slaved in time to a clock which synchronizes the main processor.

Generally, various embodiments of the present disclosure may be implemented in hardware or special purpose circuits, software, logic or any combination thereof. Some aspects may be implemented in hardware, while other aspects may be implemented in firmware or software which may be executed by a controller, microprocessor or other computing device. While various aspects of embodiments of the present disclosure are illustrated and described as block diagrams, flowcharts, or using some other pictorial representation, it will be appreciated that the blocks, apparatus, systems, techniques or methods described herein may be implemented in, as non-limiting examples, hardware, software, firmware, special purpose circuits or logic, general purpose hardware or controller or other computing devices, or some combination thereof.

The present disclosure also provides at least one computer program product tangibly stored on a non-transitory computer readable storage medium. The computer program product includes computer-executable instructions, such as those included in program modules, being executed in a device on a target real or virtual processor, to carry out the process or method as described above with reference to any of FIGS. 2-4. Generally, program modules include routines, programs, libraries, objects, classes, components, data structures, or the like that perform particular tasks or implement particular abstract data types. The functionality of the program modules may be combined or split between program modules as desired in various embodiments. Machine-executable instructions for program modules may be executed within a local or distributed device. In a distributed device, program modules may be located in both local and remote storage media.

Program code for carrying out methods of the present disclosure may be written in any combination of one or more programming languages. These program codes may be provided to a processor or controller of a general purpose computer, special purpose computer, or other programmable data processing apparatus, such that the program codes, when executed by the processor or controller, cause the functions/operations specified in the flowcharts and/or block diagrams to be implemented. The program code may execute entirely on a machine, partly on the machine, as a stand-alone software package, partly on the machine and partly on a remote machine or entirely on the remote machine or server.

The above program code may be embodied on a machine readable medium, which may be any tangible medium that may contain, or store a program for use by or in connection with an instruction execution system, apparatus, or device. The machine readable medium may be a machine readable signal medium or a machine readable storage medium. A machine readable medium may include but not limited to an electronic, magnetic, optical, electromagnetic, infrared, or semiconductor system, apparatus, or device, or any suitable combination of the foregoing. More specific examples of the machine readable storage medium would include an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing.

Further, while operations are depicted in a particular order, this should not be understood as requiring that such operations be performed in the particular order shown or in sequential order, or that all illustrated operations be performed, to achieve desirable results. In certain circumstances, multitasking and parallel processing may be advantageous. Likewise, while several specific implementation details are contained in the above discussions, these should not be construed as limitations on the scope of the present disclosure, but rather as descriptions of features that may be specific to particular embodiments. Certain features that are described in the context of separate embodiments may also be implemented in combination in a single embodiment. Conversely, various features that are described in the context of a single embodiment may also be implemented in multiple embodiments separately or in any suitable sub-combination.

Although the present disclosure has been described in language specific to structural features and/or methodological acts, it is to be understood that the present disclosure defined in the appended claims is not necessarily limited to the specific features or acts described above. Rather, the specific features and acts described above are disclosed as example forms of implementing the claims.

What is claimed is:

1. A method performed by a terminal device, the method comprising:
receiving, via radio resource control (RRC) signaling, configuration information comprising an indication indicating a set of preambles for repetitions for a message 3 transmission; and
performing random access using a preamble from the set of preambles for the repetitions for the message 3 transmission.

2. The method of claim 1, wherein the performing the random access comprises:
transmitting the preamble from the set of preambles for the repetitions for the message 3 transmission.

3. The method of claim 2, wherein the performing random access further comprises:
receiving a random access response (RAR) indicating a first number of the repetitions for the message 3 transmission.

4. A method performed by a network device, the method comprising:
transmitting, via radio resource control (RRC) signaling, configuration information comprising an indication indicating a set of preambles for repetitions for a message 3 transmission; and performing random access using a preamble from the set of preambles for the repetitions for the message 3 transmission.

5. The method of claim 4, wherein the performing the random access comprising:
receiving the preamble from the set of preambles for the repetitions for the message 3 transmission.

6. The method of claim 5, wherein the performing the random access further comprising:
transmitting a random access response (RAR) indicating a first number of the repetitions for the message 3 transmission.

7. A terminal device comprising:
at least one processor configured to:
receive, via radio resource control (RRC) signaling, configuration information comprising an indication indicating a set of preambles for repetitions for a message 3 transmission; and
perform random access using a preamble from the set of preambles for the repetitions for the message 3 transmission.

8. The terminal device of claim 7, wherein the at least one processor is configured to perform the random access by transmitting the preamble from the set of preambles for the repetitions for the message 3 transmission.

9. The terminal device of claim 8, wherein the at least one processor is configured to perform the random access further by receiving a random access response (RAR) indicating a first number of the repetitions for the message 3 transmission.

* * * * *